US012489250B2

(12) United States Patent
Takashima et al.

(10) Patent No.: US 12,489,250 B2
(45) Date of Patent: Dec. 2, 2025

(54) CONNECTOR HOUSING, CONNECTOR AND WIRE HARNESS

(71) Applicant: Yazaki Corporation, Tokyo (JP)

(72) Inventors: Naoto Takashima, Shizuoka (JP); Hiroshi Miyazaki, Shizuoka (JP); Koutaro Tobino, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 389 days.

(21) Appl. No.: 18/135,486

(22) Filed: Apr. 17, 2023

(65) Prior Publication Data

US 2023/0369805 A1 Nov. 16, 2023

(30) Foreign Application Priority Data

May 12, 2022 (JP) ................................ 2022-078598

(51) Int. Cl.
*H01R 13/629* (2006.01)
*H01R 13/28* (2006.01)
*H01R 13/502* (2006.01)

(52) U.S. Cl.
CPC ....... *H01R 13/62955* (2013.01); *H01R 13/28* (2013.01); *H01R 13/502* (2013.01); *H01R 13/62938* (2013.01)

(58) Field of Classification Search
None
See application file for complete search history.

(56) References Cited

U.S. PATENT DOCUMENTS

2003/0162426 A1 8/2003 Shinozaki et al.
2003/0162427 A1 8/2003 Shinozaki et al.
2003/0166351 A1 9/2003 Shinozaki et al.
2016/0285200 A1* 9/2016 Eow ................ H01R 13/62955

* cited by examiner

*Primary Examiner* — Ross N Gushi
(74) *Attorney, Agent, or Firm* — Sughrue Mion, PLLC

(57) ABSTRACT

A connector housing includes: a housing main body; a lever to be rotated around an axis of rotation to finally lock a partner connector to the housing main body; an electric wire cover which is a cover attached to an extending-out side of the housing main body on which the electric wire is allowed to extend out of the housing main body, the electric wire cover having a shape extending across a larger range than a trajectory of rotation of the lever in a plan view in an axial direction of the axis of rotation; and a lever slidable contact protrusion and a cover slidable contact protrusion on the lever and the electric wire cover, the slidable contact protrusions having a shape protruding so as to come into slidable contact with another of the lever or the electric wire cover on the trajectory of rotation of the lever.

7 Claims, 7 Drawing Sheets

CONNECTOR HOUSING, CONNECTOR AND WIRE HARNESS

BACKGROUND OF THE INVENTION

Technical Field

The present invention relates to a connector housing, a connector with a connector terminal accommodated in a connector housing, and a wire harness including a connector at an end of the wire harness.

Background Art

Conventionally, a connector housing is known which includes a lever, wherein the lever assists connector connection (see e.g. Patent Documents 1 to 3). In a connector with a connector terminal accommodated in such a connector housing, a partner connector is first temporarily locked to a housing main body with the lever attached thereto. Subsequently, the lever is rotated to pull and finally lock the partner connector so that the connector connection is completed.

CITATION LIST

Patent Literature

Patent Document 1: JP 2003-249303 A
Patent Document 2: JP 2003-249304 A
Patent Document 3: JP 2003-249305 A

SUMMARY OF THE INVENTION

Here, for such a connector configuration with a connector housing including a lever, the lever may be deformed depending on how a force is applied during lever rotation. Operators are required to be particularly careful to avoid such deformation. Such connector connection by rotating the lever with particular carefulness may be a burden for operators.

Therefore, the present invention is focused on the above-described problem, and an objective of the present invention is to provide a connector housing, a connector and a wire harness which enable working load related to connector connection to be reduced.

This objective is achieved by a connector housing including: a housing main body configured to accommodate a connector terminal of a terminal-combined electric wire, the terminal-combined electric wire including an electric wire and the connector terminal connected to an end of the electric wire; a lever supported by the housing main body so as to be rotatable around a predetermined axis of rotation, wherein the lever is configured to be rotated around the axis of rotation from a temporary locked position to a final locked position to pull a temporarily locked partner connector and thus finally lock the partner connector to the housing main body; an electric wire cover which is a cover configured to be attached to an extending-out side of the housing main body so as to cover and guide the electric wire in an extending direction, the extending-out side being a side of the housing main body which is configured to allow the electric wire to extend out of the housing main body when accommodating the connector terminal in the housing main body, wherein the extending-out direction is a direction in which the electric wire is guided without interfering with rotation of the lever, wherein the electric wire cover has a shape extending across a larger range than a trajectory of rotation of the lever in a plan view in an axial direction of the axis of rotation; and a slidable contact protrusion on at least one of the lever or the electric wire cover, the slidable contact protrusion having a shape which protrudes so as to come into slidable contact with another of the lever or the electric wire cover at at least one point on the trajectory of rotation of the lever.

The above-mentioned objective is further achieved by a connector including: a connector terminal; and the connector housing as described above, the connector housing being configured to accommodate the connector terminal.

The above-mentioned objective is further achieved by a wire harness including: a terminal-combined electric wire including an electric wire and a connector terminal connected to an end of the electric wire; and the connector housing as described above, the connector housing being configured to accommodate the connector terminal of the terminal-combined electric wire.

With the connector housing, connector and wire harness as described above, it is possible to reduce operation load related to connector connection.

DETAILED DESCRIPTION OF PREFERRED EMBODIMENTS

Hereinafter, embodiments of a connector housing, a connector and a wire harness will be described.

Figure 1:
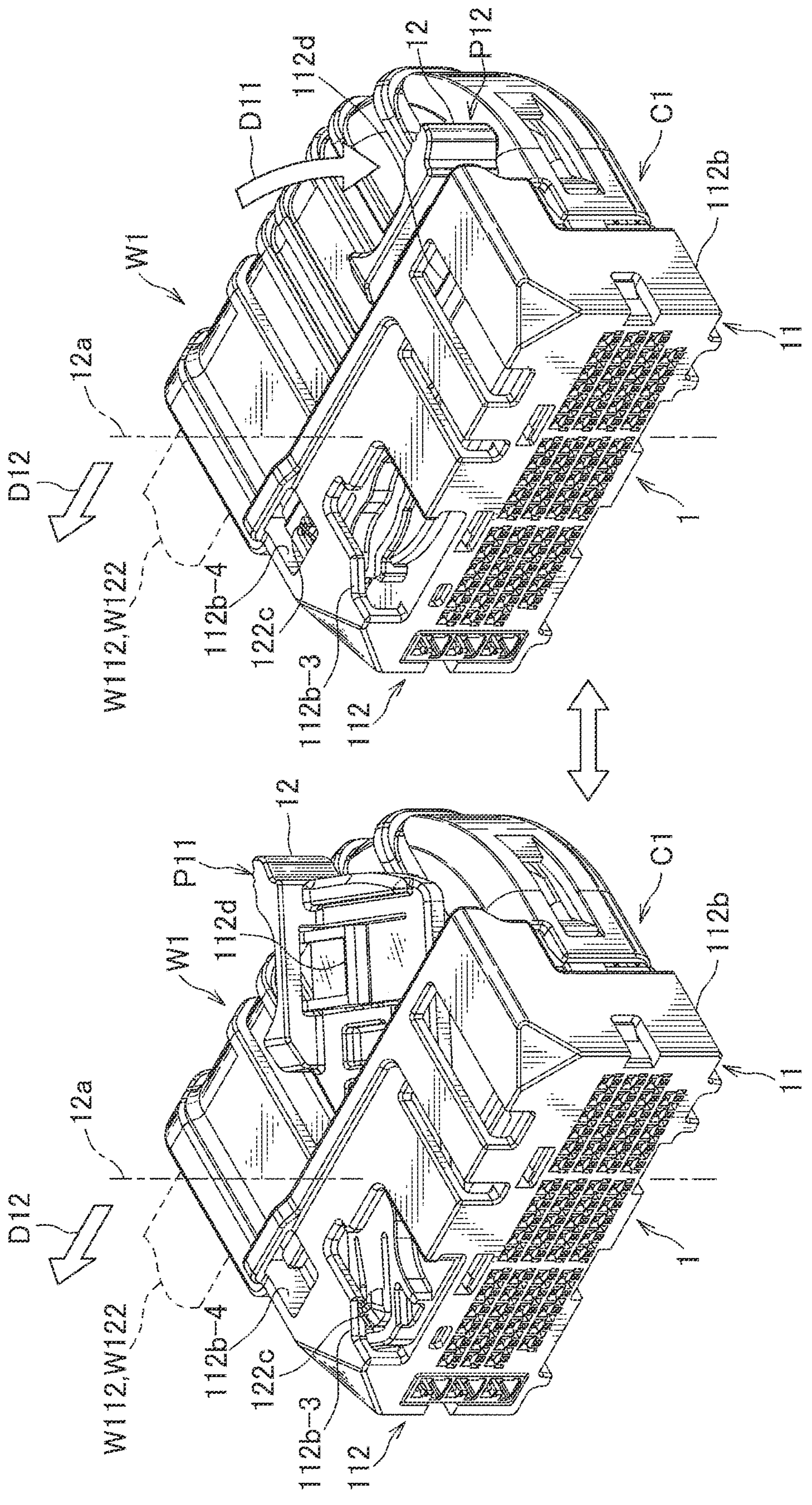
FIG. 1 is a perspective view of an embodiment of a wire harness.
Figure 2:
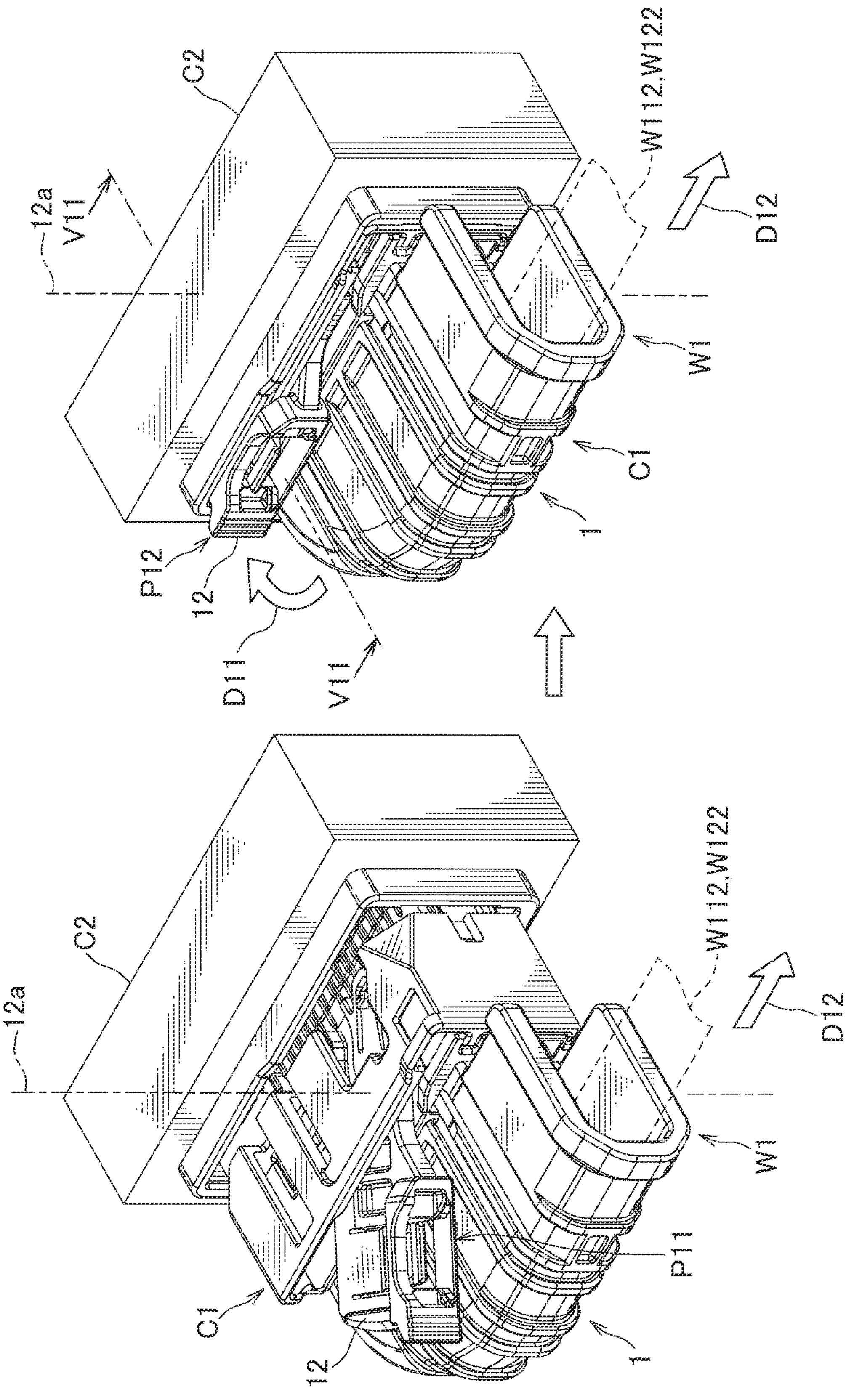
FIG. 2 shows how a connector of the wire harness according to FIG. 1 is connected to a partner connector.

FIG. 1 shows a perspective view of an embodiment of a wire harness, and FIG. 2 shows how a connector of the wire harness according to FIG. 1 is connected to a partner connector.

A wire harness W1 according to the present embodiment includes a connector C1 at an end of the wire harness W1, the connector C1 including a lever 12 for assisting connection of the connector C1 to a partner connector C2. Upon being operated by an operator, this lever 12 is rotated from a temporary locked position P11 to a final locked position P12 in a direction of rotation D11 around a predetermined axis of rotation **12*a* to assist connection of the connector C1 to the partner connector C2. The temporary locked position P11 is a lever position in which the lever 12 is coupled to the partner connector C2 when the partner connector C2 is temporarily locked to the connector C1 shallowly as shown in FIG. 2. The final locked position P12 is a lever position in which the partner connector C2 which has been temporarily locked and coupled to the lever 12 is pulled and finally locked to the connector C1. By rotating the lever 12 to the final locked position P12 and thus finally locking the partner connector C2, the wire harness W1 will be electrically connected to a partner wire harness or partner device via the connector C1 and partner connector C2. In order to release this electrical connection, first, the lever 12 is moved from the final locked position P12 to the temporary locked position P11. This movement moves the connector C1 in a direction away from the partner connector C2 to release the finally locked state so that the connector C1 is brought back to the temporarily locked state with the partner connector C2. Subsequently, the connector C1 is pulled by the operator to be removed from the partner connector C2. Hereinafter, more detailed configuration of the connector C1 of the wire harness W1 and a connector housing 1 which is part of the connector C1** will be described.

Figure 3:
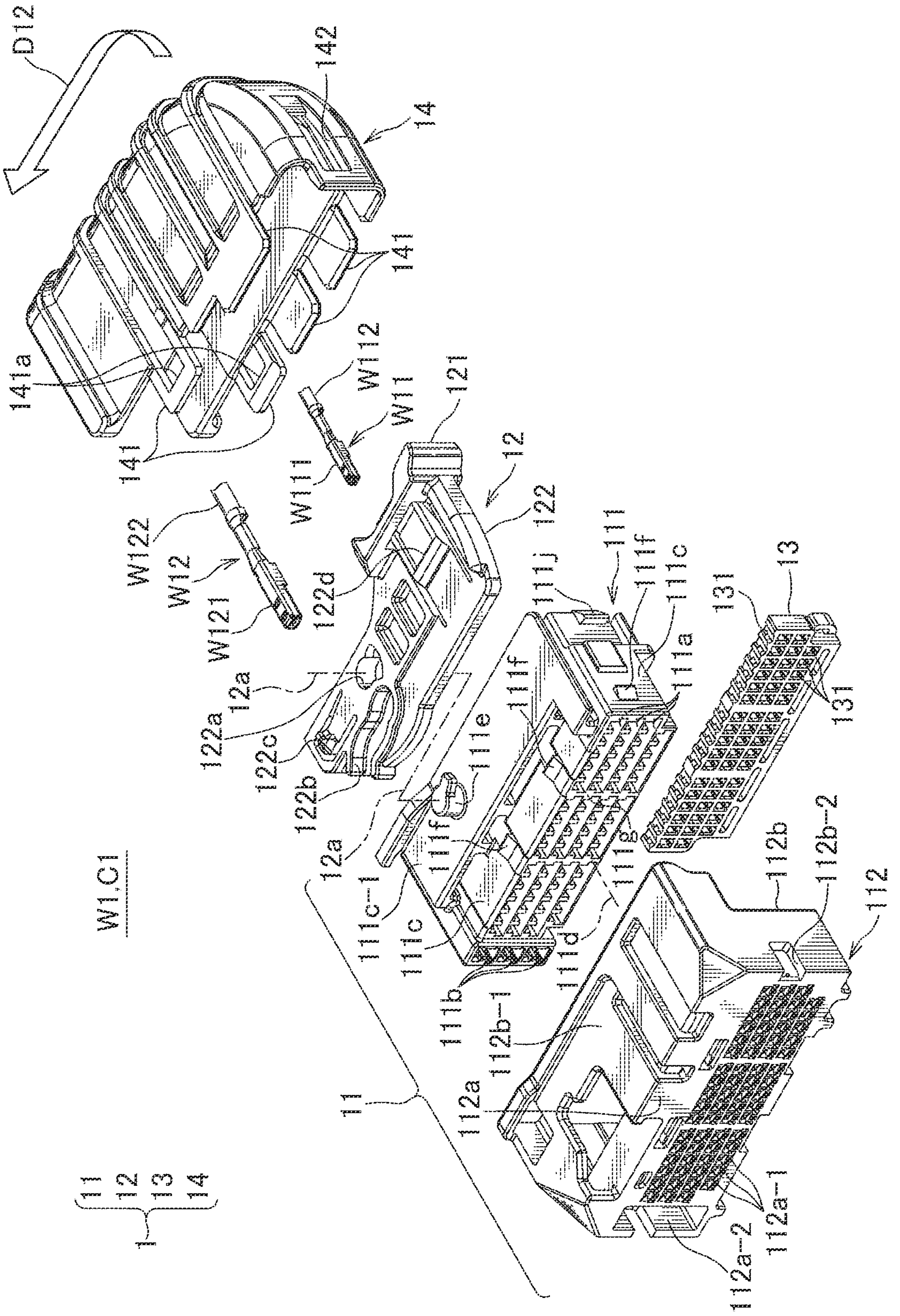
FIG. 3 is an exploded perspective view of the connector and connector housing according to FIGS. 1 and 2.
Figure 4:
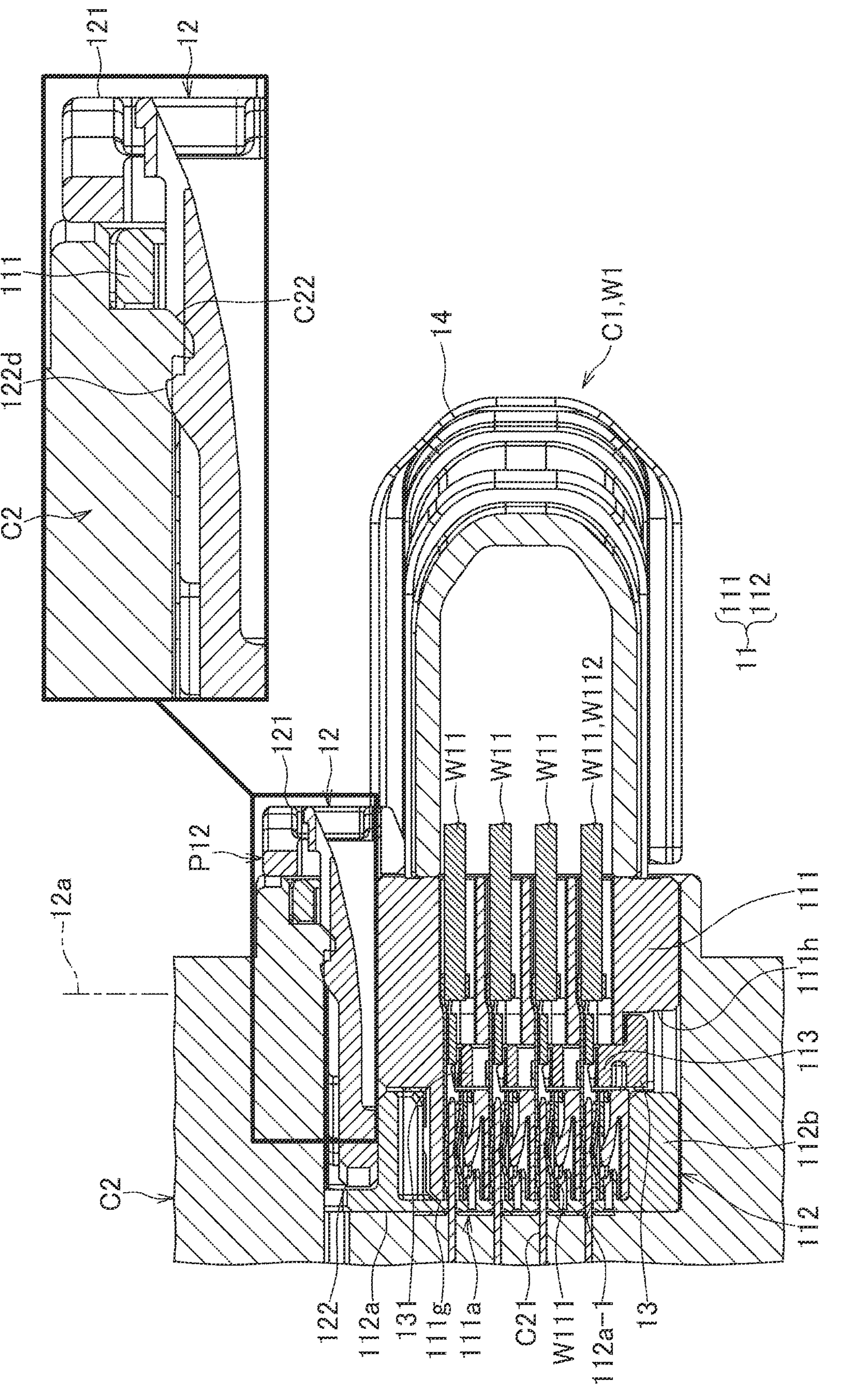
FIG. 4 is a sectional view of the connector and connector housing in a finally locked state with the partner connector along the line V11-V11 as shown in FIG. 2.

FIG. 3 shows an exploded perspective view of the connector and connector housing according to FIGS. 1 and 2. FIG. 4 shows a sectional view of the connector and connector housing in a finally locked state with the partner connector along the line V11-V11 as shown in FIG. 2.

The connector C1 includes a plurality of connector terminals W111 for respective terminal-combined electric wires W11, a plurality of large-size terminals W121 for respective large-size terminal combined electric wires W12, and a connector housing 1. Each of the terminal-combined electric wires W11 includes an electric wire W112 and a connector terminal W111 connected to an end of the electric wire W112. Each of the large-size terminal combined electric wires W12 includes a thick electric wire W122 and a large-size terminal W121 connected to an end of the thick electric wire W122, wherein the thick electric wire W122 has a larger thickness than the electric wires W112 and the large-size terminal W121 has a larger terminal size than the connector terminals W111. According to the present embodiment, both of the connector terminals W111 and large-size terminals W121 are configured as female terminals, wherein partner terminals C21 and large-size partner terminals of the partner connector C2 in the form of pin-shaped male terminals are introduced into and connected to the connector terminals W111 and large-size terminals W121, respectively. The connector housing 1 is an element which accommodates the plurality of connector terminals W111 and the plurality of large-size terminals W121, and includes a housing main body 11, the lever 12, a spacer 13 and an electric wire cover 14.

The housing main body 11 accommodates the plurality of connector terminals W111 and the plurality of large-size terminals W121. The lever 12 is supported by the housing main body 11 so as to be rotatable around the axis of rotation 12*a*, and configured to be rotated from the temporary locked position P11 to the final locked position P12 as shown in FIG. 1. By this rotation, the Lever 12 pulls the temporarily locked partner connector C2. By the lever 12 pulling the partner connector C2 in such a manner, the partner connector C2 is finally locked to the housing main body 11 (i.e. the connector C1) so that the partner terminals C21 and the large-size partner terminals are introduced into the connector terminals W111 and the large-size terminals W121.

The lever 12 includes an operated section 121 configured to be operated to be rotated, and an arm section 122 extending from the operated section 121 and intersecting the axis of rotation 12*a*, wherein the arm section 122 has a bearing hole 122*a* in an intersection position in which the arm section 122 intersects the axis of rotation 12*a*. According to the present embodiment, the lever 12 includes one operated section 121 and one arm section 122 integrated in a single-plate shape. The arm section 122 has a cam groove 122*b* which receives a portion of the partner connector C2, wherein with the progress of rotation around the axis of rotation 12*a*, the portion of the partner connector C2 is moved along the cam groove 122*b* to move the partner connector C2 toward/away from the housing main body 11. By moving the portion of the partner connector C2 within the cam groove 122*b* as the lever 12 is rotated from the temporary locked position P11 to the final locked position P12, the partner connector C2 is pulled toward the housing main body 11. On the other hand, by moving the portion of the partner connector C2 within the cam groove 122*b* as the lever 12 is rotated from the final locked position P12 to the temporary locked position P11, the partner connector C2 is moved away from the housing main body 11.

Housing main body 11 includes an inner housing 111 and an outer housing 112.

The inner housing 111 is an element made of resin, formed in a rectangular tube shape, and includes a plurality of terminal accommodating chambers 111*a* and a plurality of large-size accommodating chambers 111*b*, which accommodate the connector terminals W111 and the large-size terminals W121, respectively. An axis protrusion 111*e* protrudes from one of four outer circumferential surfaces 111*c* of the rectangular tube shape of this inner housing 111 which intersects the axis of rotation 12*a*, wherein the axis protrusion 111*e* is fitted into the bearing hole 122*a* of the arm section 122. The axis protrusion 111*e* intersects an axis 111*d* of the tubular inner housing 111 and provides the axis of rotation 12*a*. Further, locking claws 111*f* are formed on the four outer circumferential surfaces 111*c* of the inner housing 111, wherein the locking claws 111*f* are locked to the outer housing 112.

The outer housing 112 is a cover member made of resin which is provided on the exterior of the inner housing 111. The outer housing 112 includes a mask wall section 112*a* and an outer tube section 112*b*, wherein the mask wall section 112*a* covers a mating side 111*g* of the inner housing 111 for mating with the partner connector C2, and the outer tube section 112*b* extends in a tube shape from an outer circumferential edge of the mask wall section 112*a*. The mask wall section 112*a* has a plurality of through holes 112*a*-1 formed therein, wherein the through holes 112*a*-1 are in communication with the plurality of terminal accommodating chambers 111*a* which are open on the mating side 111*g* on one-to-one basis. Furthermore, a rectangular exposure window 112*a*-2 is provided in a position corresponding to the plurality of large-size accommodating chambers 111*b*, wherein the exposure window 112*a*-2 allows the openings of the plurality of large-size accommodating chambers 111*b* to be exposed together within the exposure window 112*a*-2. The outer tube section 112*b* clamps the arm section 122 of the lever 12 between a face section 111*c*-1 of the inner housing 111 and an opposite face section 112*b*-1 being opposite to the face section 111*c*-1, wherein the axis protrusion 111*e* is provided on the face section 111*c*-1. The outer tube section 112*b* further has locking holes 112*b*-2 formed therein, wherein to the locking holes 112*b*-2, the locking claws 111*f* are locked which are formed on the four outer circumferential surfaces 111*c* of the inner housing 111.

Here, the arm section 122 of the lever 12 includes a first lever locking section 122*c* and a second lever locking section 122*d*, wherein the first lever locking section 122*c* serves for retaining the lever 12 in the temporary locked position P11 and the second lever locking section 122*d* serves for retaining the lever 12 in the final locked position P12.

When the lever 12 is in the temporary locked position P11, the first lever locking section 122*c* is locked to the outer housing 112 to limit rotation to the final locked position P12. The outer tube section 112*b* of the outer housing 112 has a locked groove 112*b*-3, wherein the first lever locking section 122*c* is locked to the locked groove 112*b*-3 as shown in FIG. 1 when locking the first lever locking section 122*c* to the outer housing 112. This first lever locking section 122*c* is a protrusion for locking which is formed at a tip of a cantilever, wherein the cantilever is capable of deflection deformation. When the lever 12 is in the temporary locked position P11, the first lever locking section 122*c* is locked to the locked groove 112*b*-3 by a protrusion of the first lever locking section 122*c* being hooked to an edge of the locked groove 112*b*-3, wherein the protrusion is provided at a tip of the first lever locking section 122*c*. Once partner connector C2 is temporarily locked to housing main body 11, the first lever locking section 122*c* is deflected by the partner connector C2, which enables the protrusion at the tip to be introduced under the edge of the locked groove 112*b*-3, wherein the locking is thus released. Starting from this state, by rotating the lever 12 to the final locked position P12, the protrusion at the tip of the first lever locking section 122*c* is introduced into and moved through the interior of the outer tube section 112*b* to reach a window section 112*b*-4 which is intended as a destination for the protrusion, wherein the protrusion is then exposed in the window section 112*b*-4 and the deflection is removed.

Further, the protrusion at the tip of the first lever locking section 122*c* has a portion which comes into contact with an edge of the window section 112*b*-4 when the lever 12 is rotated from the final locked position P12 to the temporary locked position P11, the portion being formed as an oblique surface. In the case of rotation to the temporary locked position P11, this oblique surface deflects the first lever locking section 122*c* such that the protrusion is introduced below the edge of the window section 112*b*-4 and introduced into and moved through the outer tube section 112*b* in this manner to reach the locked groove 112*b*-3 which is intended as a destination for the protrusion, wherein the protrusion is then exposed and the deflection is removed. At this time, with regard to the protrusion at the tip of the first lever locking section 122*c*, the portion of this protrusion which comes into contact with the edge of the locked groove 112*b*-3 when the lever 12 is rotated to the final locked position P12 is arranged as a vertical surface substantially orthogonally to the lever 12. This vertical surface prevents the protrusion at the tip from being introduced below the edge of the locked groove 112*b*-3 to maintain the locked state unless unlocking occurs by temporarily locking by the partner connector C2, whereby the lever 12 is retained in the temporary locked position P11.

On the other hand, the second lever locking section 122*d* for retaining the lever 12 to final locked position P12 is configured as follows: In a state where the lever 12 is rotated to the final locked position P12 and the partner connector C2 is finally locked to the housing main body 11, the second lever locking section 122*d* is locked to a locked section C22 of the partner connector C2, as shown in FIG. 4. By this locking, the second lever locking section 122*d* limits rotation of the lever 12 to the temporary locked position P11. The second lever locking section 122*d* is a step for locking which is formed in the middle of the cantilever capable of deflection deformation. When the lever 12 is in the final locked position P12, the second lever locking section 122*d* is locked to the locked section C22 of the partner connector C2 by the step in the middle being hooked to the locked section C22. The step and the locked section C22 have mutually facing portions which face each other and are formed as oblique surfaces, wherein when finally locking the partner connector C2, both oblique surfaces slide on each other and the second lever locking section 122*d* is thus deflected until it has crossed over the locked section C22. On the other hand, each of locked surface of the step and locked section C22 is a vertical surface which comes into surface contact with the other locked surface. After locking, these vertical surfaces prevent the step from crossing over the locked section C22 in an opposite direction to maintain the locked state, whereby the lever 12 is retained in the final locked position P12. Here, when the second lever locking section 122*d* is operated by the operator to push down and deflect the tip portion of the cantilever, the step in the middle is removed from the locked section C22 of the partner connector C2 upon the operation, whereby the locking is released.

Next, the spacer 13 in the connector housing 1 will be described. As shown in the sectional view of FIG. 4, this spacer 13 is a plate-shaped element which is introduced into the inner housing 111 of the housing main body 11 and extends transversely to the terminal accommodating chambers 111*a*. The spacer 13 includes a plurality of tightening limitation sections 131 which are associated to the plurality of terminal accommodating chambers 111*a* on a one-to-one basis and configured to tighten the connector terminals W111 so as to limit movement of the connector terminals W111 within the respective terminal accommodating chambers 111*a*. As for the large-size accommodating chambers 111*b* of the inner housing 111, it is to be noted that they are locked by large lances within the large-size accommodating chambers 111*b* to sufficiently limit their movement relative to the large-size terminals W121. Accordingly, the spacer 13 is formed in a shape which is introduced into the inner housing 111 so as to avoid the large-size accommodating chambers 111*b* and to extend transversely only to the terminal accommodating chambers 111*a*. Furthermore, the inner housing 111 has an entrance section 111*h* for the spacer 13 on a side of the inner housing 111 opposite to the axis protrusion 111*e*, the entrance section 111*h* being open for the spacer 13, as shown in FIG. 4. The spacer 13 is inserted into the inner housing 111 through the entrance section 111*h* of the inner housing 111.

Here, the spacer 13 is introduced into the inner housing 111 by two-step introduction as follows: In a first step before accommodating the connector terminals W111 into the terminal accommodating chambers 111*a*, the spacer 13 is introduced to a first position in which the connector terminals W111 are allowed to be moved within the terminal accommodating chambers 111*a*. This means that in this first position, the plurality of tightening limitation sections 131 of the spacer 13 do not tighten the connector terminals W111 so that the connector terminals W111 are allowed to be moved. In the first step, the spacer 13 is temporarily locked in this first position. Furthermore, without movement limitation of the connector terminals W111 by the tightening limitation sections 131, the connector terminals W111 are accommodated into the terminal accommodating chambers 111*a* of the connector housing 1 to which the spacer 13 is temporarily locked in the first position. Once accommodation of all connector terminals W111 is completed, in the next second step, the spacer 13 is pushed into the inner housing 111 from the first position until the spacer 13 reaches a second position which will be described below. In the second position, the tightening limitation sections 131 tighten the connector terminals W111 so that movement of the connector terminals W111 within the terminal accommodating chambers 111*a* is limited. In this second position, the spacer 13 is finally locked. Furthermore, the spacer 13 is provided so as to be movable between the first position and the second position, wherein when exchanging the connector terminals W111, the spacer 13 is pulled out from the first position to the second position to release the limitation of movement of the connector terminals W111.

Next, the electric wire cover 14 in the connector housing 1 will be described. The electric wire cover 14 is attached to an electric wire extending-out side of the inner housing 111 of the housing main body 11, wherein the electric wire extending-oud side is configured to accommodate the connector terminals W111 and the large-size accommodating chambers W121 and to allow the electric wires W112, W122 to extend out of the housing main body 11. As shown in FIG. 3, cover locking claws 111*j* for fixing the electric wire cover 14 are formed on the electric wire extending-out side of the inner housing 111. The cover locking claws 111*j* are provided in three of four outer circumferential surfaces 111*c*, i.e., on one lateral surface which is visible in FIG. 3, as well as on a lower surface side which is hidden in FIG. 3, and on an upper surface side which is hidden by the face section 111*c*-1 for the axis protrusion 111*e*. On the other hand, the electric wire cover 14 includes cover locking holes 141*a* in two of a plurality of inserted tongues 141 which extend toward the inner housing 111, wherein two cover locking claws 111*j* on the upper and lower surface sides are locked to the cover locking holes 141*a*. Furthermore, one lateral wall locking hole 142 is formed in a lateral wall of the electric wire cover 14, wherein the cover locking claws 111*j* on the above-mentioned lateral surface is locked to the lateral wall locking hole 142. The electric wire cover 14 is fixed to the electric wire extending-out side of the inner housing 111 in the inner housing 111 by locking the three cover locking claws 111*j* of the inner housing 111 to the above-mentioned locking holes in the three locations. Then, on this electric wire extending-out side, the electric wire cover 14 covers the electric wires W112, W122 extending out of the inner housing 111, and additionally, guides the electric wires W112, W122 along an extending-out direction D12, wherein the extending-out direction D12 extends laterally without interfering with rotation of the lever 12, as shown in FIGS. 1 to 3. In this case, the electric wire cover 14 is formed to have the following relation to a trajectory of rotation of the lever 12.

Figure 5:
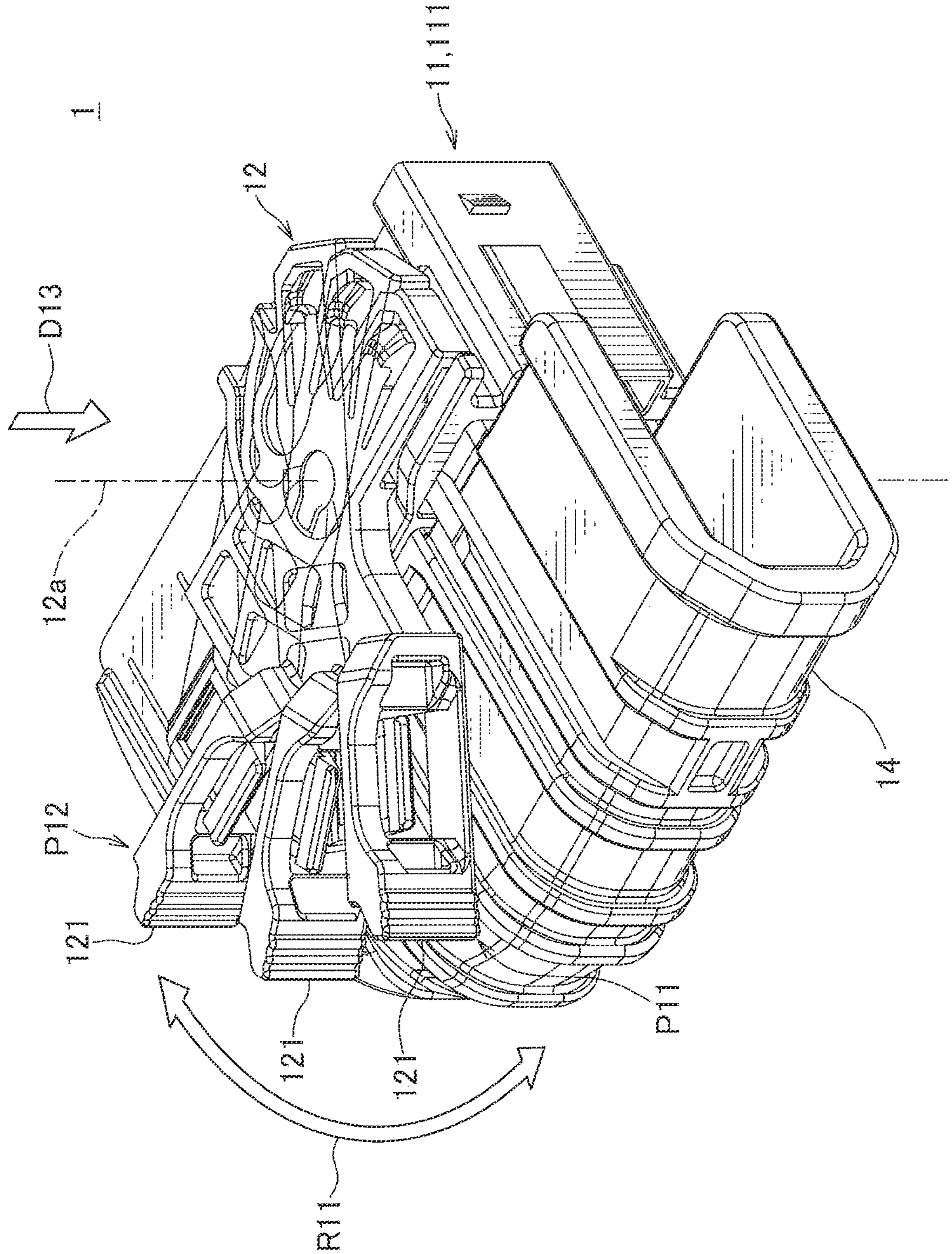
FIG. 5 schematically shows a relation between a trajectory of rotation of a lever and an electric wire cover.

FIG. 5 schematically shows a relation between a trajectory of rotation of a lever and an electric wire cover.

Figure 6:
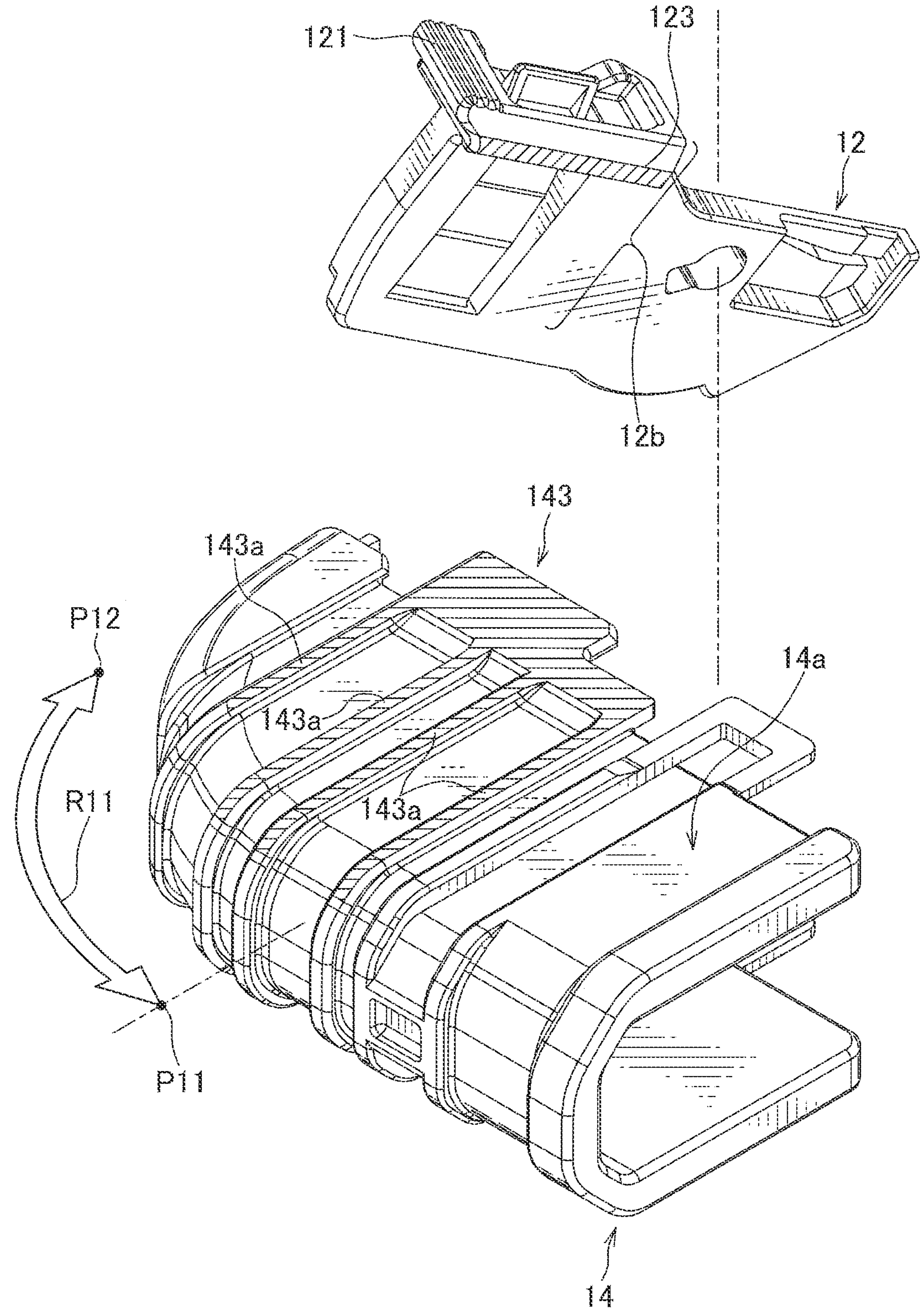
FIG. 6 schematically shows a structure for supporting the rotating lever from the electric wire cover side and protecting the lever.
Figure 7:
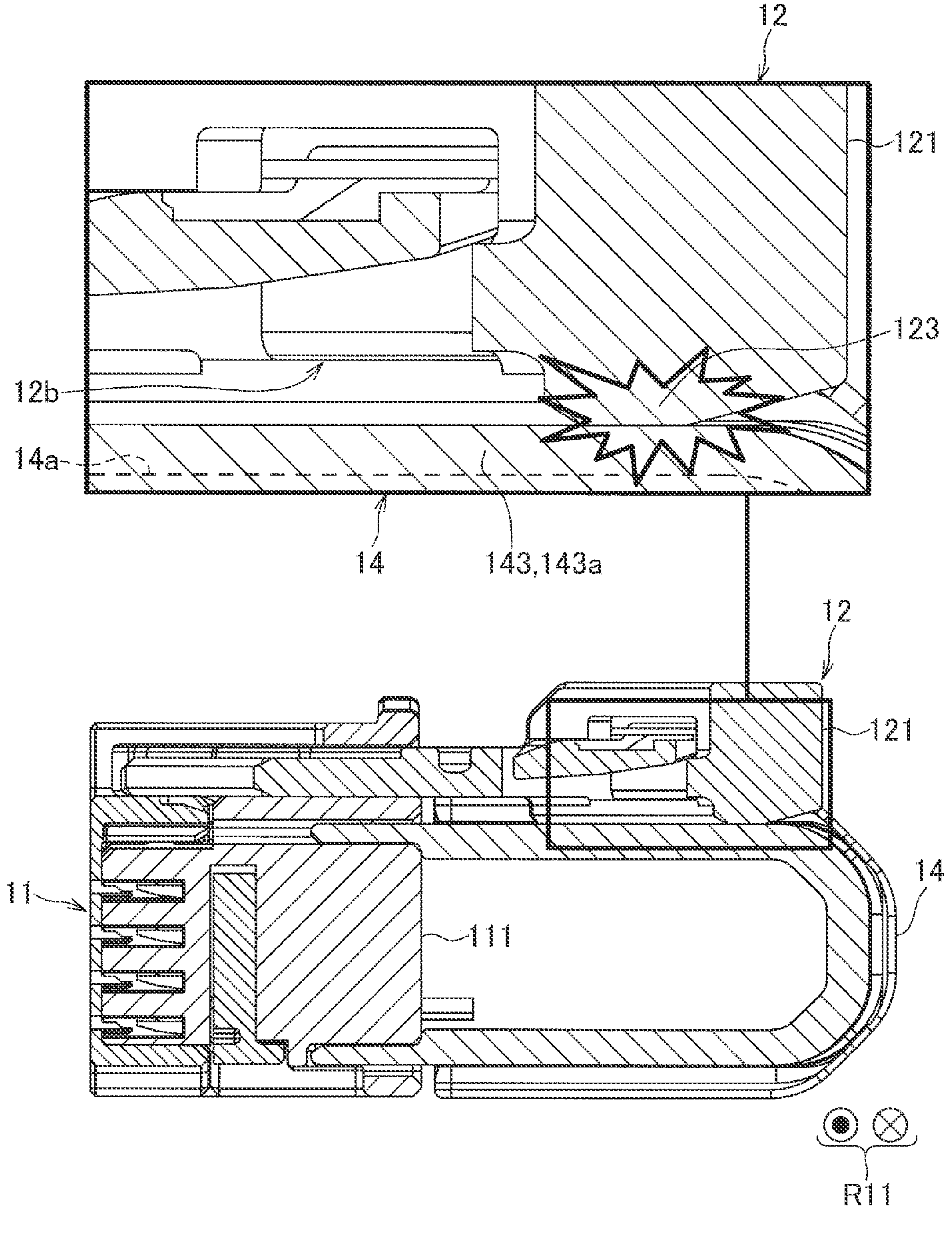
FIG. 7 shows the structure according to FIG. 6 in a sectional view intersecting the trajectory of rotation of the lever.

This FIG. 5 shows the trajectory of rotation R11 of the lever 12 of the connector housing 1 with the outer housing 112 removed therefrom. The trajectory of rotation R11 of the lever 12 has a circular-sector shape which has a center at the axis of rotation 12*a* and extends between the temporary locked position P11 and the final locked position P12. The electric wire cover 14 has a shape which extends across a larger range than the trajectory of rotation R11 of the lever 12 in a plan view in an axial direction D13 of the axis of rotation 12*a*. In other words, this connector housing 1 is provided such that the lever 12 is always rotated along an outer surface of the electric wire cover 14. In order to support this rotating lever 12 from the electric wire cover 14 side and to protect it, the connector housing 1 has the following structure:

FIG. 6 schematically shows a structure for supporting the rotating lever from the electric wire cover side and protecting the lever. FIG. 7 shows the structure according to FIG. 6 in a sectional view intersecting the trajectory of rotation of the lever.

According to the present embodiment, both the single-plate-shaped lever 12 and the electric wire cover 14 include slidable contact protrusions which are formed in a shape protruding so as to come into slidable contact with each other. The lever 12 includes a lever slidable contact protrusion 123 on a lever facing surface 12*b* facing the electric wire cover 14. The electric wire cover 14 includes a cover slidable contact protrusion 143 on a cover facing surface 14*a*, i.e., one of outer surfaces of the electric wire cover 14 which faces the lever facing surface 12*b*. The lever slidable contact protrusion 123 and cover slidable contact protrusion 143 are configured to come into slidable contact with each other discontinuously at multiple points, including the temporary locked position P11, along the trajectory of rotation R11 of the lever 12 extending between the temporary locked position P11 and the final locked position P12. According to the present embodiment, this temporary locked position P11 corresponds to a position in which the operated section 121 is positioned farthest away from the inner housing 111 of the housing main body 11 along the trajectory of rotation R11 of the lever 12, as shown e.g. in FIG. 5. Accordingly, in the temporary locked position P11, the operated section 121 of the lever 12 tends to receive a large load from the operator during rotation of the lever 12, and therefore, support of the lever 12 is most required. In order to support the lever 12 at multiple points including this temporary locked position P11, the cover slidable contact protrusion 143 is formed in a rib shape which extends in the form of four comb teeth orthogonally from a coupled side of the electric wire cover 14 for coupling to the inner housing 111, and intersect the trajectory of rotation R11. All of the four ribs 143*a* of the cover slidable contact protrusion 143 come into slidable contact with the lever slidable contact protrusion 123 at tip end edges of the ribs 143*a*.

On the other hand, the lever slidable contact protrusion 123 is formed in a shape with a trapezoidal cross-section as shown in FIG. 7 at the operated section 121 of the lever 12, and extends across the total width of the operated section 121. The lever slidable contact protrusion 123 comes into slidable contact with the tip end edges of the ribs 143*a* of the cover slidable contact protrusion 143 at a convex end edge of the lever slidable contact protrusion 123 which corresponds to an upper base of the trapezoid.

The connector housing 1, connector C1 and wire harness W1 according to the above-described embodiment enable the following effects to be achieved: According to this embodiment, the electric wire cover 14 has a shape which extends across a larger range than the trajectory of rotation R11 of the lever 12. Furthermore, the lever slidable contact protrusion 123 on the lever 12 and the cover slidable contact protrusion 143 on the electric wire cover 14 come into slidable contact with each other at multiple points along the trajectory of rotation R11 of the lever 12. At the points where the lever slidable contact protrusion 123 and the cover slidable contact protrusion 143 are in slidable contact with each other, the lever 12 which is being rotated is supported by the electric wire cover 14 extending across a larger range than the trajectory of rotation R11 of the lever 12. By supporting the lever 12 by the electric wire cover 14, it is possible to reduce deformation of the lever 12 even if some load is applied to the lever 12 during connector connection. Since the effect of reducing the lever deformation is expected, the burden for the operator who rotates the lever 12 can be reduced by a corresponding amount. In this manner, the present embodiment enables the working load related to connector connection to be reduced.

Furthermore, in the temporary locked position P11 of the lever 12 according to the present embodiment, the operated section 121 is configured to be positioned farthest away from the housing main body 11 along the trajectory of rotation R11. In addition, the lever slidable contact protrusion 123 and cover slidable contact protrusion 143 are configured to come into slidable contact with each other at least in the temporary locked position P11. Since in this configuration, the lever 12 is supported by the electric wire cover 14 in the temporary locked position P11 in which the operated section 121 is positioned farthest away from the housing main body 11 and the lever 12 is subject to deformation, the above-described configuration enables the deformation of the lever 12 during rotation to be effectively reduced.

Furthermore, the cover slidable contact protrusion 143 according to the present embodiment is formed in the form of four ribs which protrude so as to come into slidable contact with the lever slidable contact protrusion 123 at tip end edges of the ribs. This configuration enables deformation of the lever 12 to be reduced while facilitating movement of the lever 12 because this configuration can achieve a reduced friction between the cover slidable contact protrusion 143 and the lever slidable contact protrusion 123 during their slidable contact. Further, the cover slidable contact protrusion 143 in the form of ribs can increase the wall strength of electric wire cover 14 on which the cover slidable contact protrusion 143 are formed.

As the slidable contact protrusion, the present embodiment further provides the cover slidable contact protrusion 143 formed on the electric wire cover 14 such that the cover slidable contact protrusion 143 comes into slidable contact with the operated section 121 of the lever 12. This configuration enables the support strength of the electric wire cover 14 to be increased because the cover slidable contact protrusion 143 is provided on the electric wire cover 14 which supports the lever 12.

As the slidable contact protrusion, the present embodiment further provides the lever slidable contact protrusion 123 formed on the operated section 121 of the lever 12 such that the lever slidable contact protrusion 123 comes into slidable contact with the electric wire cover 14. This configuration enables the electric wire cover 14 to support the lever 12 across a large range along the trajectory of rotation R11 of the lever 12 because the lever slidable contact protrusion 123 formed on the operated section 121 is rotated together with the lever 12.

Furthermore, according to the present embodiment, the lever slidable contact protrusion 123 is provided on the lever facing surface **12*b* of the single-plate-shaped lever 12, and the cover slidable contact protrusion 143 is provided on the cover facing surface 14*a* of the electric wire cover 14. According to this configuration, only one single-plate-shaped lever 12 is rotatably supported by the housing main body 11. Thus, in comparison e.g. with a C-shaped lever including two arm sections which are rotatably supported, it is possible to effectively support the lever 12 by the electric wire cover 14 through the pair of slidable contact protrusions while reducing a thickness of the connector housing 1 in the axial direction D13 of the axis of rotation 12*a***.

It is to be noted that the above-described embodiment merely shows representative embodiments for a connector housing, connector and a wire harness, and the present invention is not limited to such a connector housing, connector and wire harness, which may be modified and implemented in various manners.

For example, the above-described embodiment shows the connector housing 1 with the housing main body 11 having a rectangular block shape, the connector C1 and the wire harness W1 as examples for a connector housing, a connector and a wire harness. However, the connector housing, connector and wire harness are not limited thereto, but the housing main body may have any housing shape, for example a cylindrical block shape.

Furthermore, the above-described embodiment shows the connector housing 1 with the housing main body 11 divided into two parts, i.e. the inner housing 111 and outer housing 112, as an example for a connector housing. However, the connector housing is not limited thereto, and may include a housing main body formed as a single-body element, provided that it is rotatably supported by the lever.

Furthermore, the above-described embodiment shows the connector housing 1 with slidable contact protrusions provided on both of the lever 12 and electric wire cover 14 as an example for a connector housing. However, the connector housing is not limited thereto, and may include only a slidable contact protrusion provided on one of the lever or electric wire cover.

Furthermore, the above-described embodiment shows the connector housing 1 with slidable contact protrusions provided so as to slide at multiple points along the trajectory of rotation R11 of the lever 12, as an example for a connector housing. However, the connector housing is not limited thereto, but may include slidable contact protrusions so as to slide on each other only at one point, provided that they slide on each other at least at one point along the trajectory of rotation.

Furthermore, the above-described embodiment shows the connector housing 1 with the lever slidable contact protrusion 123 and cover slidable contact protrusion 143 provided so as to slide on each other in the temporary locked position P11 of the lever 12, as an example for a connector housing. However, the connector housing is not limited thereto, but the slidable contact protrusions may be provided so as to slide on each other at any specific point along the trajectory of rotation. However, deformation of the lever 12 can be effectively reduced during its rotation by slidable contact protrusions which are provided so as to slide on each other at least in the temporary locked position P11, as described above.

Furthermore, the above-described embodiment shows the connector housing 1 with the cover slidable contact protrusion 143 in the form of four ribs, as an example for a connector housing. However, the connector housing is not limited thereto, but the cover slidable contact protrusion 143 may be formed on the outer surface of the electric wire cover, e.g. in a planar shape which fully covers the trajectory of rotation R11 of the lever 12. However, by employing the cover slidable contact protrusion 143 in the form of ribs, the friction during slidable contact can be reduced and movement of the lever 12 can be facilitated, wherein the rib form can also increase the wall strength of the electric wire cover 14, as described above.

Furthermore, the above-described embodiment shows the connector housing 1 with the cover slidable contact protrusion 143, as an example for a connector housing. However, the connector housing is not limited thereto, but there may be no slidable contact protrusions on the electric wire cover.

However, the support strength of the electric wire cover 14 can be increased by the cover slidable contact protrusion 143, as described above.

Furthermore, the above-described embodiment shows the connector housing 1 with the lever slidable contact protrusion 123, as an example for a connector housing. However, the connector housing is not limited thereto, but there may be no slidable contact protrusions on the lever. However, it is possible to support the lever 12 by the electric wire cover 14 across a large range along the trajectory of rotation R11 by the lever slidable contact protrusion 123, as described above.

Furthermore, the above-described embodiment shows the connector housing 1 with the lever 12 having a single-plate shape, as an example for a connector housing. However, the connector housing is not limited thereto, but may include e.g. a C-shaped lever with two arm sections which are rotatably supported. However, the thickness of the connector housing 1 can be reduced by the lever 12 having a single-plate shape, as described above.

REFERENCE SIGNS LIST

1 Connector housing
11 Housing main body
12 Lever
12*a* Axis of rotation
12*b* Lever facing surface
13 Spacer
14 Electric wire cover
14*a* Cover facing surface
111 Inner housing
111*a* Terminal accommodating chambers
111*b* Large-size accommodating chambers
111*c* Outer circumferential surface
111*c*-1 Face section
111*d* Axis
111*e* Axis protrusion
111*g* Mating side
111*f* Locking claws
111*h* Entrance section
111*j* Cover locking claws
112 Outer housing
112*a* Mask wall section
112*a*-1 Through holes
112*a*-2 Exposure window
112*b* Outer tube section
112*b*-1 Opposite face section
112*b*-2 Locking holes
112*b*-3 Locked groove
112*b*-4 Window section
121 Operated section
122 Arm section
122*a* Bearing hole
122*b* Cam groove
122*c* First lever locking section
122*d* Second lever locking section
123 Lever slidable contact protrusion
131 Tightening limitation sections
141 Inserted tongues
141*a* Cover locking holes
142 Lateral wall locking hole
143 Cover slidable contact protrusion
143*a* Ribs
C1 Connector
C2 Partner connector
C21 Partner terminals
C22 Locked section
D11 Direction of rotation
D12 Extending direction
D13 Axial direction
P11 Temporary locked position
P12 Final locked position
R11 Trajectory of rotation
W1 Wire harness
W11 Terminal-combined electric wires
W111 Connector terminals
W112 Electric wires
W12 Large-size terminal combined electric wires
W121 Large-size terminals
W122 Thick electric wires

What is claimed is:

1. A connector housing comprising:

a housing main body configured to accommodate a connector terminal of a terminal-combined electric wire, the terminal-combined electric wire including an electric wire and the connector terminal connected to an end of the electric wire;

a lever supported by the housing main body so as to be rotatable around a predetermined axis of rotation, wherein the lever is configured to be rotated around the axis of rotation from a temporary locked position to a final locked position to pull a temporarily locked partner connector and thus finally lock the partner connector to the housing main body;

an electric wire cover which is a cover configured to be attached to an extending-out side of the housing main body so as to cover and guide the electric wire in an extending-out direction, the extending-out side being a side of the housing main body which is configured to allow the electric wire to extend out of the housing main body when accommodating the connector terminal in the housing main body, wherein the extending-out direction is a direction in which the electric wire is guided without interfering with rotation of the lever, wherein the electric wire cover has a shape extending across a larger range than a trajectory of rotation of the lever in a plan view in an axial direction of the axis of rotation; and a slidable contact protrusion on at least one of the lever or the electric wire cover, the slidable contact protrusion having a shape which protrudes so as to come into slidable contact with another of the lever or the electric wire cover at at least one point on the trajectory of rotation of the lever, wherein the lever includes:

an operated section configured to be operated to be rotated; and an arm section extending from the operated section and intersecting the axis of rotation, wherein the arm section has a bearing hole in an intersection position in which the arm section intersects the axis of rotation, wherein in the temporary locked position, the operated section is configured to be positioned farthest away from the housing main body along the trajectory of rotation of the lever, and wherein the slidable contact protrusion is configured to come into slidable contact with the another at least in the temporary locked position.

2. The connector housing according to claim 1, wherein the slidable contact protrusion has a rib shape which protrudes so as to come into slidable contact with the another at a tip end edge of the rib shape.

3. A connector comprising:

a connector terminal; and the connector housing according to claim 1, the connector housing being configured to accommodate the connector terminal.

4. A wire harness comprising:

a terminal-combined electric wire including an electric wire and a connector terminal connected to an end of the electric wire; and the connector housing according to claim 1, the connector housing being configured to accommodate the connector terminal of the terminal-combined electric wire.

5. A connector housing comprising:

a housing main body configured to accommodate a connector terminal of a terminal-combined electric wire, the terminal-combined electric wire including an electric wire and the connector terminal connected to an end of the electric wire;

a lever supported by the housing main body so as to be rotatable around a predetermined axis of rotation, wherein the lever is configured to be rotated around the axis of rotation from a temporary locked position to a final locked position to pull a temporarily locked partner connector and thus finally lock the partner connector to the housing main body;

an electric wire cover which is a cover configured to be attached to an extending-out side of the housing main body so as to cover and guide the electric wire in an extending-out direction, the extending-out side being a side of the housing main body which is configured to allow the electric wire to extend out of the housing main body when accommodating the connector terminal in the housing main body, wherein the extending-out direction is a direction in which the electric wire is guided without interfering with rotation of the lever, wherein the electric wire cover has a shape extending across a larger range than a trajectory of rotation of the lever in a plan view in an axial direction of the axis of rotation; and a slidable contact protrusion on at least one of the lever or the electric wire cover, the slidable contact protrusion having a shape which protrudes so as to come into slidable contact with another of the lever or the electric wire cover at at least one point on the trajectory of rotation of the lever, wherein the lever includes:

an operated section configured to be operated to be rotated; and an arm section extending from the operated section and intersecting the axis of rotation, wherein the arm section has a bearing hole in an intersection position in which the arm section intersects the axis of rotation, and wherein the slidable contact protrusion includes at least a cover slidable contact protrusion which is provided at the electric wire cover so as to come into slidable contact with the operated section of the lever.

6. A connector housing, comprising:

a housing main body configured to accommodate a connector terminal of a terminal-combined electric wire, the terminal-combined electric wire including an electric wire and the connector terminal connected to an end of the electric wire;

a lever supported by the housing main body so as to be rotatable around a predetermined axis of rotation, wherein the lever is configured to be rotated around the axis of rotation from a temporary locked position to a final locked position to pull a temporarily locked partner connector and thus finally lock the partner connector to the housing main body;

an electric wire cover which is a cover configured to be attached to an extending-out side of the housing main body so as to cover and guide the electric wire in an extending-out direction, the extending-out side being a side of the housing main body which is configured to allow the electric wire to extend out of the housing main body when accommodating the connector terminal in the housing main body, wherein the extending-out direction is a direction in which the electric wire is guided without interfering with rotation of the lever, wherein the electric wire cover has a shape extending across a larger range than a trajectory of rotation of the lever in a plan view in an axial direction of the axis of rotation; and a slidable contact protrusion on at least one of the lever or the electric wire cover, the slidable contact protrusion having a shape which protrudes so as to come into slidable contact with another of the lever or the electric wire cover at at least one point on the trajectory of rotation of the lever, wherein the lever includes:

an operated section configured to be operated to be rotated; and an arm section extending from the operated section and intersecting the axis of rotation, wherein the arm section has a bearing hole in an intersection position in which the arm section intersects the axis of rotation, and wherein the slidable contact protrusion includes at least a lever slidable contact protrusion which is provided at the operated section of the lever so as to come into slidable contact with the electric wire cover.

7. A connector housing, comprising:

a housing main body configured to accommodate a connector terminal of a terminal-combined electric wire, the terminal-combined electric wire including an electric wire and the connector terminal connected to an end of the electric wire;

a lever supported by the housing main body so as to be rotatable around a predetermined axis of rotation, wherein the lever is configured to be rotated around the axis of rotation from a temporary locked position to a final locked position to pull a temporarily locked partner connector and thus finally lock the partner connector to the housing main body;

an electric wire cover which is a cover configured to be attached to an extending-out side of the housing main body so as to cover and guide the electric wire in an extending-out direction, the extending-out side being a side of the housing main body which is configured to allow the electric wire to extend out of the housing main body when accommodating the connector terminal in the housing main body, wherein the extending-out direction is a direction in which the electric wire is guided without interfering with rotation of the lever, wherein the electric wire cover has a shape extending across a larger range than a trajectory of rotation of the lever in a plan view in an axial direction of the axis of rotation; and a slidable contact protrusion on at least one of the lever or the electric wire cover, the slidable contact protrusion having a shape which protrudes so as to come into slidable contact with another of the lever or the electric wire cover at at least one point on the trajectory of rotation of the lever, wherein the lever includes one operated section and one arm section integrated in a single-plate shape, the operated section being configured to be operated to be rotated, the arm section extending from the operated section and intersecting the axis of rotation, wherein the arm section has a bearing hole in an intersection position in which the arm section intersects the axis of rotation, and wherein the slidable contact protrusion is provided on at least one surface of a lever facing surface of the lever having the single-plate shape or a cover facing surface of the electric wire cover, the lever facing surface facing the electric wire cover, and the cover facing surface being an outer surface of the electric wire cover which faces the lever facing surface.

* * * * *